US012790962B1

(12) United States Patent
MacFarlane et al.

(10) Patent No.: US 12,790,962 B1
(45) Date of Patent: Nov. 10, 2026

(54) BEARING CAVITY SEALING DURING DIFFERENT OPERATIONAL MODES OF AIRCRAFT ENGINE SYSTEM

(71) Applicant: Pratt & Whitney Canada Corp., Longueuil (CA)

(72) Inventors: Ian MacFarlane, St-Bruno (CA); Michel Abdelnour, Greenfield Park (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 19/276,627

(22) Filed: Jul. 22, 2025

(51) Int. Cl.
*F01D 25/18* (2006.01)
*F01D 25/16* (2006.01)
*F16J 15/16* (2006.01)

(52) U.S. Cl.
CPC ........... *F01D 25/183* (2013.01); *F01D 25/16* (2013.01); *F16J 15/164* (2013.01); *F05D 2240/54* (2013.01); *F05D 2240/55* (2013.01); *F05D 2260/38* (2013.01); *F05D 2260/98* (2013.01)

(58) Field of Classification Search
None
See application file for complete search history.

(56) References Cited

U.S. PATENT DOCUMENTS

| | | | | |
|---|---|---|---|---|
| 3,937,477 A * | 2/1976 | Gyory | F16J 15/164 277/377 |
| 4,477,088 A * | 10/1984 | Picard | F16J 15/363 277/379 |
| 6,565,095 B2 * | 5/2003 | Meacham | F16J 15/3404 277/411 |
| 7,118,336 B2 | 10/2006 | Waddleton | |
| 10,520,035 B2 | 12/2019 | Duffy et al. | |
| 10,927,960 B2 | 2/2021 | Bernacchi et al. | |
| 11,199,103 B2 | 12/2021 | Wolfer et al. | |
| 11,346,448 B2 | 5/2022 | Rak | |
| 11,415,225 B2 | 8/2022 | Swift et al. | |
| 11,428,323 B2 | 8/2022 | Amador | |
| 11,713,812 B2 * | 8/2023 | Sell | F16J 15/3284 277/428 |
| 12,180,843 B2 | 12/2024 | Marleau-Finley | |

(Continued)

FOREIGN PATENT DOCUMENTS

CN 113028059 B 12/2022

*Primary Examiner* — Juan G Flores
(74) *Attorney, Agent, or Firm* — CANTOR COLBURN LLP

(57) ABSTRACT

A bearing and seal arrangement of a gas turbine engine includes a bearing supportive of a rotating component of the gas turbine engine, and a bearing cavity at least partially containing the bearing, with a volume of lubricant located inside the bearing cavity. A primary seal is positioned between the rotatable shaft and a rotationally fixed bearing housing. The primary seal includes a rotating seal element and a rotationally fixed outer seal element interactive with the rotating seal element. An axially movable seal face seal element is structured and positioned to be axially spaced apart from a face seal interface in an opened position when the gas turbine engine is in a first operating condition and axially engaged with the face seal interface in a closed position to seal the bearing cavity when the gas turbine engine is in a second operating condition.

19 Claims, 4 Drawing Sheets

(56) References Cited

U.S. PATENT DOCUMENTS

| | | | | |
|---|---|---|---|---|
| 2003/0011135 | A1* | 1/2003 | Meacham ............ | F16J 15/3404 277/408 |
| 2022/0107023 | A1* | 4/2022 | Sell ........................ | F16J 15/164 |
| 2022/0162993 | A1 | 5/2022 | Sawyers-Abbott et al. | |

* cited by examiner

BEARING CAVITY SEALING DURING DIFFERENT OPERATIONAL MODES OF AIRCRAFT ENGINE SYSTEM

BACKGROUND

Exemplary embodiments of the present disclosure pertain to the art of aircraft engine systems, and in particular to sealing of bearing cavities of a gas turbine engine during different operational modes of the gas turbine engine.

Gas turbine engines include rotating components such as shafts and rotors that are supported by bearings. Bearings require lubrication for proper operation, so a typical gas turbine engine includes one or more bearing compartments in which a volume of lubricant is contained with the bearing to provide lubrication to the bearing.

In certain operational modes, such as when the gas turbine engine is part of a hybrid engine system, the gas turbine engine may be operationally stopped, at which time the flow of pressurized air typically used to seal the bearing cavity is also stopped. In such instances, lubricant may leak from the bearing cavity to other locations of the gas turbine engine.

BRIEF DESCRIPTION

In one embodiment, a bearing and seal arrangement of a gas turbine engine includes a bearing supportive of a rotating component of the gas turbine engine, and a bearing cavity at least partially containing the bearing, with a volume of lubricant located inside the bearing cavity. A primary seal is positioned between the rotatable shaft and a rotationally fixed bearing housing. The primary seal includes a rotating seal element and a rotationally fixed outer seal element interactive with the rotating seal element. An axially movable seal face seal element structured and positioned relative to the rotating seal element and the rotationally fixed outer seal element to be axially spaced apart from a face seal interface in an opened position when the gas turbine engine is in a first operating condition and axially engaged with the face seal interface in a closed position to seal the bearing cavity when the gas turbine engine is in a second operating condition.

Additionally or alternatively, in this or other embodiments the face seal element is positioned in a face seal carrier and a spring element is positioned in the face seal carrier and is configured to bias the face seal element toward the closed position.

Additionally or alternatively, in this or other embodiments in the second operating condition the face seal element is moved to the closed position by action of the spring element.

Additionally or alternatively, in this or other embodiments the face seal element includes an axially-facing element surface.

Additionally or alternatively, in this or other embodiments in the first operating condition the face seal element is urged into the open position via a high pressure airflow acting on the axially-facing element surface and overcoming a biasing force of the spring element.

Additionally or alternatively, in this or other embodiments the second operating condition includes absence of the high pressure airflow.

Additionally or alternatively, in this or other embodiments the high pressure airflow is generated from operation of a turbine of the gas turbine engine.

Additionally or alternatively, in this or other embodiments the bearing cavity is sealed via the high pressure airflow.

Additionally or alternatively, in this or other embodiments the rotating component is a shaft of the gas turbine engine.

Additionally or alternatively, in this or other embodiments a bearing housing at least partially defines the bearing cavity, and the rotationally fixed outer seal element is positioned at the bearing housing.

In another embodiment, a gas turbine engine includes a turbine rotor operably connected to a shaft, and a bearing and seal arrangement including a bearing supportive of the shaft, a bearing cavity at least partially containing the bearing with a volume of lubricant located inside the bearing cavity, and a primary seal positioned between the rotatable shaft and a rotationally fixed bearing housing. The primary seal includes a rotating seal element and a rotationally fixed outer seal element interactive with the rotating seal element. An axially movable seal face seal element is structured and positioned relative to the rotating seal element and the rotationally fixed outer seal element to be axially spaced apart from a face seal interface in an opened position when the gas turbine engine is in a first operating condition, and axially engaged with the face seal interface in a closed position to seal the bearing cavity when the gas turbine engine is in a second operating condition.

Additionally or alternatively, in this or other embodiments the face seal element is positioned in a face seal carrier and a spring element is positioned in the face seal carrier and is configured to bias the face seal element toward the closed position.

Additionally or alternatively, in this or other embodiments in the second operating condition the face seal element is moved to the closed position by action of the spring element.

Additionally or alternatively, in this or other embodiments the face seal element includes an axially-facing element surface.

Additionally or alternatively, in this or other embodiments in the first operating condition the face seal element is urged into the open position via a high pressure airflow acting on the axially-facing element surface and overcoming a biasing force of the spring element.

Additionally or alternatively, in this or other embodiments the second operating condition includes absence of the high pressure airflow.

Additionally or alternatively, in this or other embodiments the high pressure airflow is generated from operation of a turbine of the gas turbine engine.

Additionally or alternatively, in this or other embodiments the bearing cavity is sealed via the high pressure airflow.

Additionally or alternatively, in this or other embodiments the rotating component is a shaft of the gas turbine engine.

Additionally or alternatively, in this or other embodiments a bearing housing at least partially defines the bearing cavity, and the rotationally fixed outer seal element is positioned at the bearing housing.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
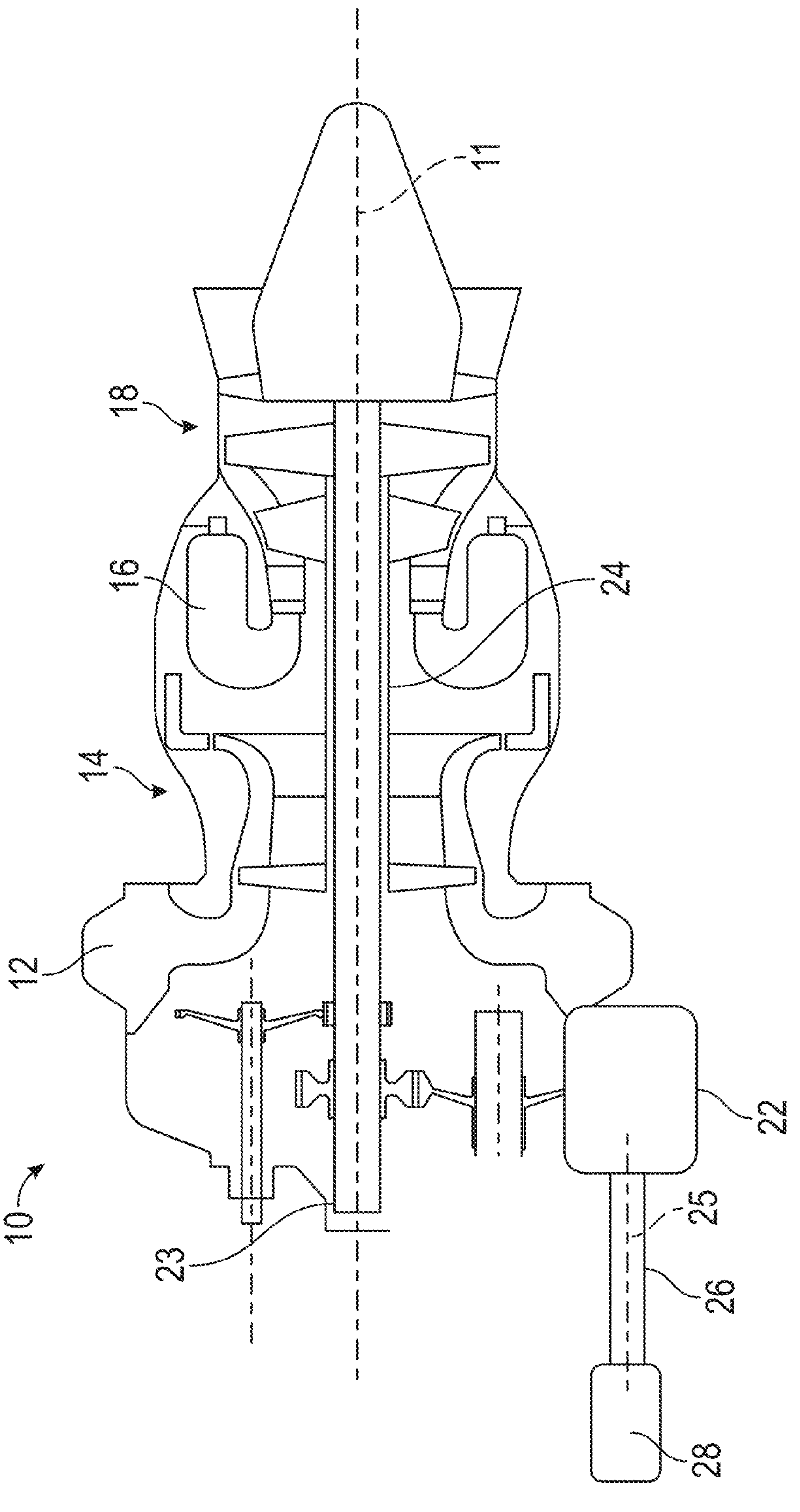
FIG. 1 is schematic illustration of an embodiment of a gas turbine engine.

FIG. 1 illustrates a gas turbine engine 10 of a type preferably provided for use in subsonic flight, generally comprising in serial flow communication an inlet 12 through which ambient air enters the gas turbine engine 10, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14, and the turbine section 18 are rotatable about a central axis 11 of the engine 10.

A low pressure shaft 23 is drivingly connected to low pressure rotor(s) of the turbine section 18, and the high pressure rotor(s) of the compressor section 14 is/are drivingly connected to high pressure rotor(s) of the turbine section 18 through a high pressure shaft 24.

The gas turbine engine 10 includes a gear box 22 operably connected to an output shaft 26, which in some embodiments rotates about a shaft axis 25 offset from the central axis 11. The output shaft 26 is, in some embodiments, connected to one or more components 28 of the aircraft, such as a propeller or fan, and may also be connected to an electrical generator to generate electrical power to be utilized by aircraft systems.

Figure 2:
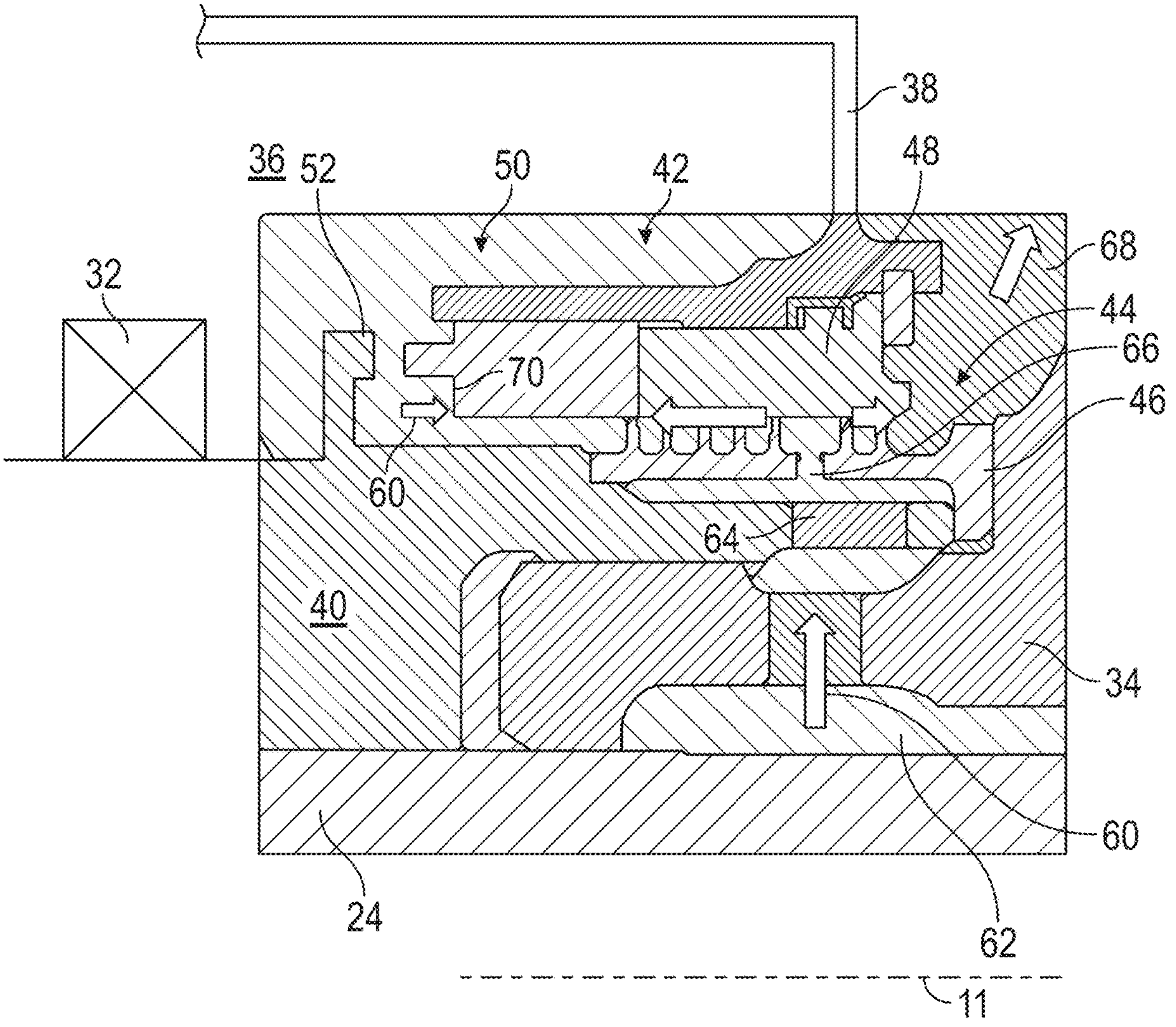
FIG. 2 is a partial cross-sectional illustration of an embodiment of a bearing and seal arrangement of a gas turbine engine in a first operating condition.

FIG. 2 illustrates a bearing and bearing cavity arrangement of the gas turbine engine 10. The illustrated bearing 32 is supportive of the high pressure shaft 24, but one skilled in the art will readily appreciate that the present disclosure may be applied to other bearings of the gas turbine engine 10. The high pressure shaft 24 is operably connected to a high pressure turbine rotor 34 and is driven about the central axis 11 by the high pressure turbine rotor 34. The bearing 32 is disposed in a bearing cavity 36 at least partially defined by a bearing housing 38, a seal runner 40 radially between the shaft 24 and the bearing 32, and the high pressure shaft 24. A seal assembly 42 is defined between the seal runner 40 seal housing 38, and includes a primary seal 44 that may include a knife edge seal element 46 that rotates with the high pressure shaft 24 and a rotationally fixed outer seal element 48. In some embodiments, the outer seal element 48 is installed to the bearing housing 38. The knife edge seal element 46 defines a tortuous pathway between the knife edge seal element 46 and the outer seal element 48, thus preventing leakage of lubricant from the bearing cavity 36. While a knife edge seal element 46 is illustrated and described herein, one skilled in the art will readily appreciate that other seal configurations, such as a controlled gap carbon seal, may be utilized.

Figure 3:
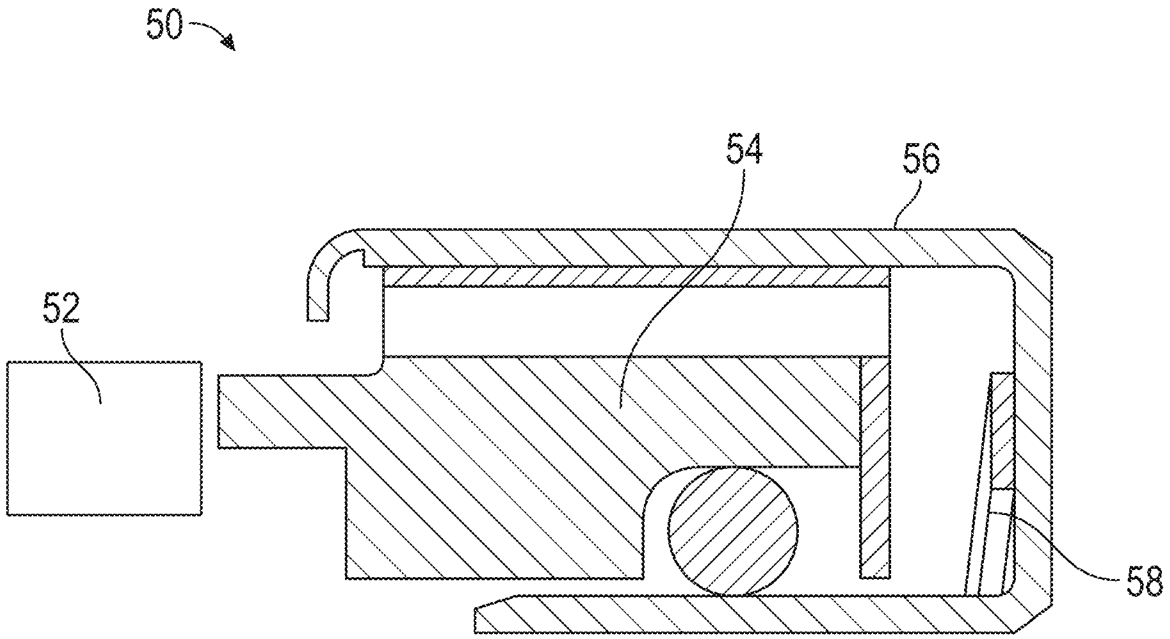
FIG. 3 is a cross-sectional view of an embodiment of a face seal.

The seal assembly 42 further includes a face seal 50, which is movable in an axial direction to selectably engage with a face seal interface 52 of the seal runner 40. Referring to FIG. 3, the face seal 50 includes a face seal element 54 disposed in a face seal carrier 56. The face seal element 54 is biased axially toward the face seal interface 52 by a spring element 58 disposed in the face seal carrier 56 between the face seal element 54 and the face seal carrier 56. In some embodiments, the spring element 58 is a coil spring, but one skilled in the art will readily appreciate that other types of spring elements 58 may be utilized. The face seal element 54 is axially movable relative to the outer seal element 48 via air pressure acting on the face seal element 54.

Referring again to FIG. 2, in a first operating mode, the gas turbine engine 10 is operating and the high pressure shaft 24 is driven about the central axis 11 by the high pressure turbine rotor 34. This rotation generates a high pressure airflow 60 directed from a first cavity 62 between the high pressure shaft 24 and the high pressure turbine rotor 34, and through a runner opening 64 in the seal runner 40, and through a knife edge opening 66 in the knife edge seal element 46. The high pressure airflow 60 is urged toward the bearing cavity 36 and into a second cavity 68 defined radially outboard of the high pressure turbine rotor 34. The high pressure airflow 60 directed toward the bearing cavity 36 acts on an axially facing element surface 70 of the face seal element 54, overcoming a biasing force of the spring element 58 to urge the face seal element 54 into an opened position away from the face seal interface 52. The pressure of the high pressure airflow 60 is sufficient in this mode to contain the lubricant in the bearing cavity 36 and prevent leakage of the lubricant therefrom.

Figure 4:
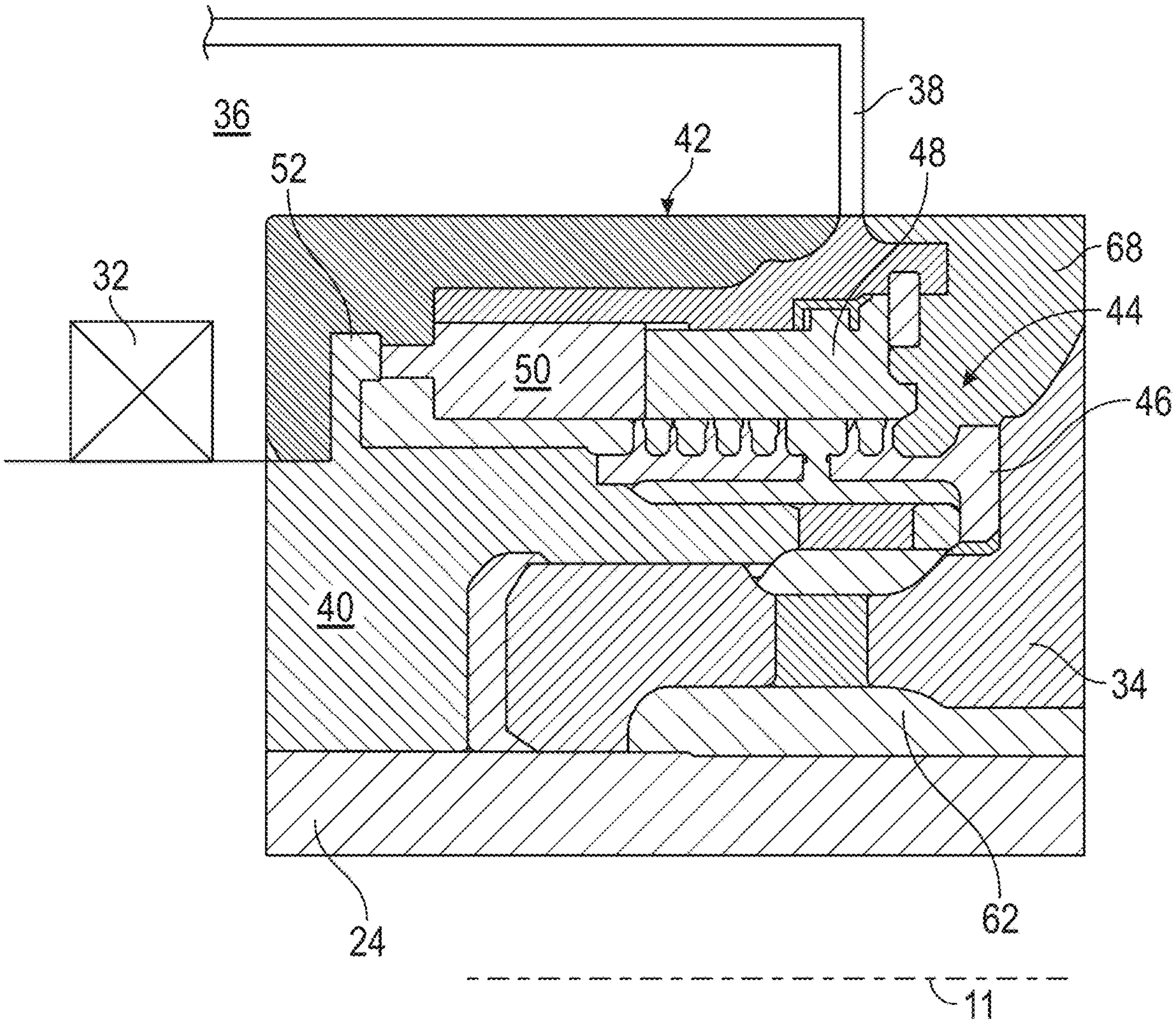
FIG. 4 is a partial cross-sectional illustration of an embodiment of a bearing and seal arrangement of a gas turbine engine in a second operating condition.

Another mode of operation, one in which the high pressure shaft 24 and the high pressure turbine rotor 34 are not rotating about the central axis 11, is illustrated in FIG. 4. In this mode, there is no high pressure airflow 60 acting on the axially-facing element surface 70. Thus, the spring element 58 acts to urge the face seal element 54 toward and into contact with the face seal interface 52 to seal the bearing cavity 36 without the presence of the high pressure airflow 60. The face seal 50 and the operation thereof allows for sealing of the bearing cavity 36 during multiple engine operating conditions, such as when the high pressure shaft 24 and the high pressure turbine rotor 34 are not rotating about the central axis 11.

The term “about” is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A bearing and seal arrangement of a gas turbine engine, comprising:

a bearing supportive of a rotating component of the gas turbine engine;

a bearing cavity at least partially containing the bearing, a volume of lubricant disposed inside the bearing cavity;

a primary seal disposed between the rotating component and a rotationally fixed bearing housing, the primary seal including:

a rotating seal element; and a rotationally fixed outer seal element interactive with the rotating seal element; and an axially movable seal face seal element structured and disposed relative to the rotating seal element and the rotationally fixed outer seal element to be:

axially spaced apart from a face seal interface in an opened position when the gas turbine engine is in a first operating condition; and axially engaged with the face seal interface in a closed position to seal the bearing cavity when the gas turbine engine is in a second operating condition.

2. The bearing and seal arrangement of claim 1, wherein the face seal element is disposed in a face seal carrier and a spring element is disposed in the face seal carrier and is configured to bias the face seal element toward the closed position.

3. The bearing and seal arrangement of claim 2, wherein in the second operating condition the face seal element is moved to the closed position by action of the spring element.

4. The bearing and seal arrangement of claim 1, wherein the face seal element includes an axially-facing element surface.

5. The bearing and seal arrangement of claim 4, wherein in the first operating condition the face seal element is urged into the opened position via a high pressure airflow acting on the axially-facing element surface and overcoming a biasing force of the spring element.

6. The bearing and seal arrangement of claim 5, wherein the second operating condition includes absence of the high pressure airflow.

7. The bearing and seal arrangement of claim 5, wherein the high pressure airflow is generated from operation of a turbine of the gas turbine engine.

8. The bearing and seal arrangement of claim 5, wherein the bearing cavity is sealed via the high pressure airflow.

9. The bearing and seal arrangement of claim 1, wherein the rotating component is a shaft of the gas turbine engine.

10. The bearing and seal arrangement of claim 1 wherein the rotationally fixed outer seal element is disposed at the rotationally fixed bearing housing.

11. A gas turbine engine comprising:

a turbine rotor operably connected to a shaft;

a bearing and seal arrangement including:

a bearing supportive of the shaft;

a bearing cavity at least partially containing the bearing, a volume of lubricant disposed inside the bearing cavity;

a primary seal disposed between the shaft and a rotationally fixed bearing housing, the primary seal including:

a rotating seal element; and a rotationally fixed outer seal element interactive with the rotating seal element; and an axially movable seal face seal element structured and disposed relative to the rotating seal element and the rotationally fixed outer seal element to be:

axially spaced apart from a face seal interface in an opened position when the gas turbine engine is in a first operating condition; and axially engaged with the face seal interface in a closed position to seal the bearing cavity when the gas turbine engine is in a second operating condition.

12. The gas turbine engine of claim 11, wherein the face seal element is disposed in a face seal carrier and a spring element is disposed in the face seal carrier and is configured to bias the face seal element toward the closed position.

13. The gas turbine engine of claim 12, wherein in the second operating condition the face seal element is moved to the closed position by action of the spring element.

14. The gas turbine engine of claim 12, wherein the face seal element includes an axially-facing element surface.

15. The gas turbine engine of claim 14, wherein in the first operating condition the face seal element is urged into the open position via a high pressure airflow acting on the axially-facing element surface and overcoming a biasing force of the spring element.

16. The gas turbine engine of claim 15, wherein the second operating condition includes absence of the high pressure airflow.

17. The gas turbine engine of claim 15, wherein the high pressure airflow is generated from operation of a turbine of the gas turbine engine.

18. The gas turbine engine of claim 15, wherein the bearing cavity is sealed via the high pressure airflow.

19. The gas turbine engine of claim 11, wherein the rotationally fixed outer seal element is disposed at the rotationally fixed bearing housing.

* * * * *